Oct. 29, 1963  L. K. V. SUDROW  3,108,764
FORWARD THRUST MEANS FOR DUCTED ROTOR SUSTAINED AIRCRAFT
Filed Sept. 18, 1961  2 Sheets-Sheet 1

*INVENTOR.*
LYLE K. V. SUDROW
BY  *Knox & Knox*

INVENTOR.
LYLE K. V. SUDROW
BY Knox & Knox

United States Patent Office 3,108,764
Patented Oct. 29, 1963

3,108,764
FORWARD THRUST MEANS FOR DUCTED
ROTOR SUSTAINED AIRCRAFT
Lyle K. V. Sudrow, Los Angeles, Calif., assignor to
Helipod, Inc., Oceanside, Calif.
Filed Sept. 18, 1961, Ser. No. 138,629
4 Claims. (Cl. 244—23)

The present invention relates generally to aircraft and more particularly to forward thrust means for ducted rotor sustained aircraft.

The primary object of this invention is to provide means for increasing the forward thrust potential of an aircraft sustained by a ducted lifting rotor, the duct having an inlet slot to admit air through the frontal portion when the aircraft is in forward flight.

Another object of this invention is to provide forward thrust means wherein the air inlet slot in the duct is fitted with a movable shutter to control the airflow.

A further object of this invention is to provide forward thrust means wherein the air flowing through the duct inlet slot induces a more efficient airflow through the rotor.

Finally, it is an object to provide forward thrust means of the aforementioned character which is simple to construct and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Similar characters of reference indicate similar or identical elements and portions throughout the specification and throughout the views of the drawings.

*General Structure*

Figure 1:
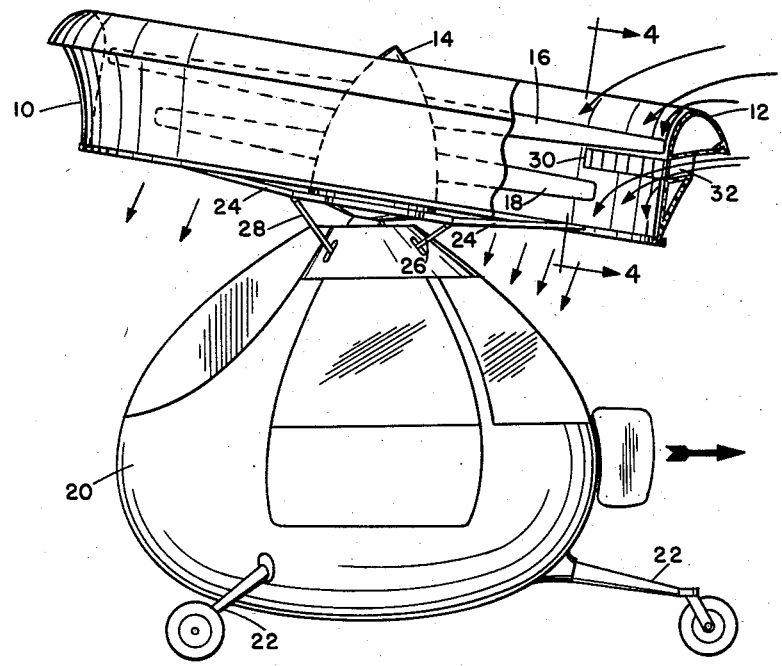
FIGURE 1 is a side elevation view of a typical aircraft incorporating the ducted rotor.
Figure 2:
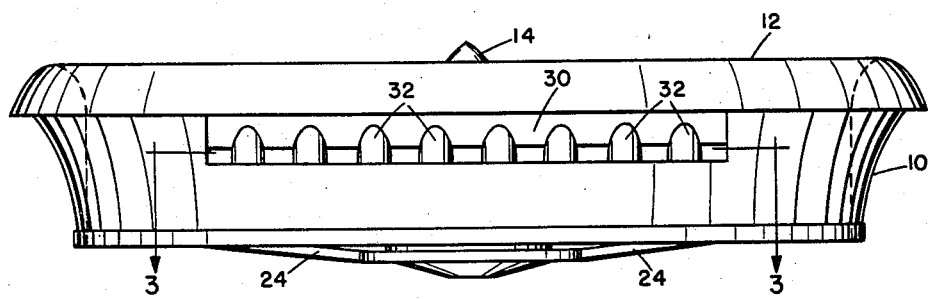
FIGURE 2 is an enlarged front elevation view of the duct.

The duct 10 is a circular structure having a curved upper lip 12 of suitable aerodynamic form to guide air smoothly into the duct. Axially mounted in duct 10 is a hub 14 carrying counter-rotating rotors 16 and 18, which support the aircraft. The rotors may be driven by any suitable source of power. The aircraft itself is illustrated as a streamlined fuselage 20 pivotally suspended from the hub 14, the fuselage having suitable landing gear 22 and containing all necessary controls and equipment. Many different types of airframe structures may be used in conjunction with the ducted rotor, that illustrated merely being an example.

The duct is attached to the hub 14 by radially extending support arms 24, and connected to said support arms are control rods 26 and 28 by which the duct and rotor assembly is tilted for directional control. A suitable control system is illustrated and described in my copending application for Aircraft, Serial No. 124,566, filed July 17, 1961.

When the rotor axis is vertical, the aircraft is supported in a level condition, either hovering, ascending, or descending according to rotor speed. By tilting the duct and rotor assembly the airflow through the duct is deflected and causes the aircraft to move in a particular direction. As illustrated in FIGURE 1, when the forward portion of duct 10 is lowered, air is directed rearwardly, so propelling the aircraft forwardly, as indicated by directional arrows. Without the use of a separate propulsion means for forward flight, level flight speed is limited since the airflow from the rotor is not fully directed in the line of flight and a large part of the power is needed to support the aircraft. Any additional thrust which can be obtained to increase forward speed is therefore desirable.

*Forward Thrust Structure*

Figure 3:
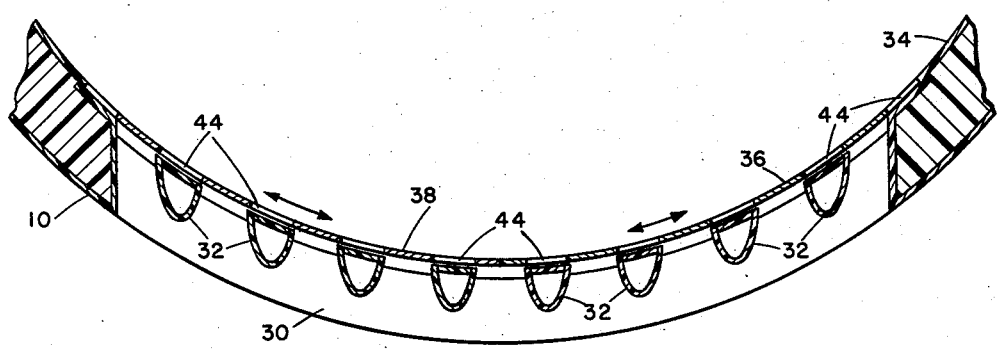
FIGURE 3 is an enlarged sectional view taken on line 3—3 of FIGURE 2.
Figure 4:
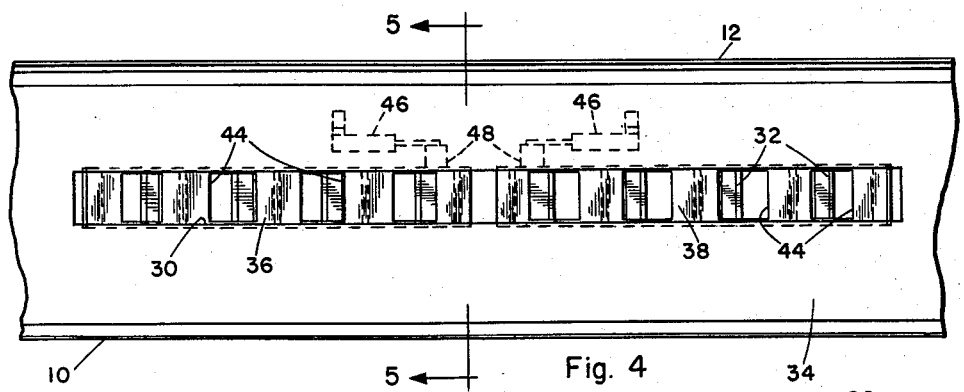
FIGURE 4 is an enlarged fragmentary view in the direction of arrows 4—4 of FIGURE 1.
Figure 5:
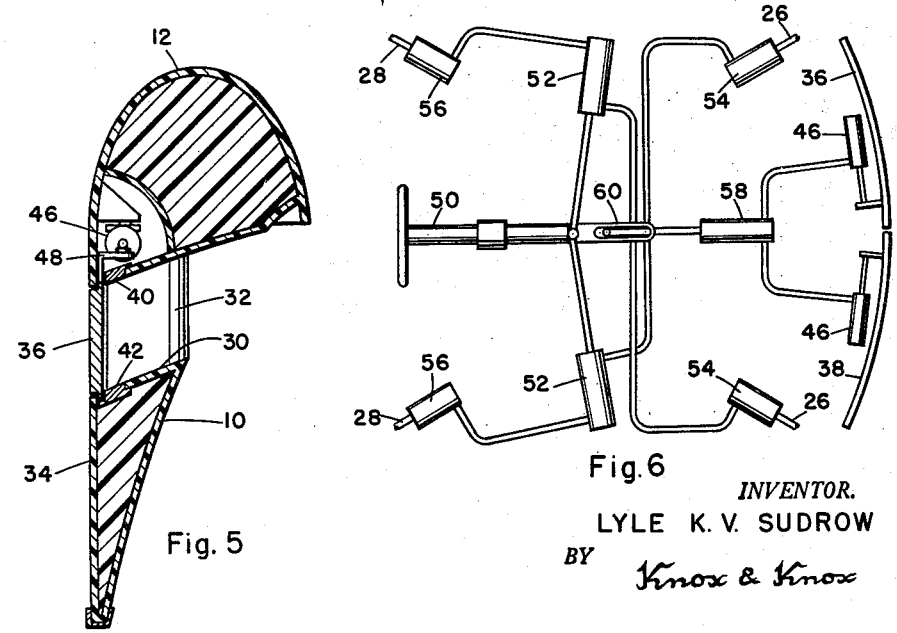
FIGURE 5 is an enlarged sectional view taken on line 5—5 of FIGURE 4.

In the forward portion of duct 10 is a circumferentially extending inlet slot 30 which is inclined downwardly into the interior of the duct, the slot being divided by a plurality of streamlined support vanes 32. The inlet slot 30 opens into the interior of duct 10 at substantially the mid-height of the inner wall 34 and below the upper rotor 16, as in FIGURE 1. Mounted in the inner wall 34 are a pair of shutters 36 and 38, which are slidable circumferentially between upper and lower rails 40 and 42 extending around the inner end of the inlet duct, as in FIGURE 5. The shutters have openings 44 spaced to correspond with the spaces between the support vanes 32 in one position, so that the inlet slot is open to admit air. In closed position the openings 44 are disposed behind the wide inner ends of support vanes 32, as in FIGURE 3, the imperforate portions of the shutters then effectively closing the inlet slot. When closed, the shutters 36 and 38 meet in the center and open outwardly in opposite directions, FIGURE 4 illustrating a partially open position.

Various means may be used to operate the shutters, that illustrated comprising a pair of jacks 46, electrically or fluid actuated, which are coupled to the shutters 36 and 38 by suitable brackets 48. The jacks are preferably enclosed within the duct structure.

*Operation*

When the shutters 36 and 38 are closed, the normal airflow is downwardly through the duct 10, which is tilted to various degrees for directional control and maneuvering. In forward flight, with the duct tilted as indicated in FIGURE 1, the airflow is downwardly and rearwardly from the duct. With the inlet slot 30 open, additional air is admitted with considerable ram effect and added to the total flow, the opening of the inlet slot also reducing the drag on the forward portion of the duct. In high speed forward flight, air would tend to flow across the top of the duct to some extent before being drawn downwardly through the rotors, so leaving a relatively air deficient zone in the forward part of the duct. The additional air admitted through the inlet slot relieves the low pressure zone and, in addition, induces or entrains airflow along the duct wall, thus further reducing the pressure drop. The effect is a type of boundary layer control, the aerodynamics of which are well known.

The shutters may be operated by any suitable pilot actuated control, such as a switch or lever, or can be coupled to the duct actuating means to open the shutters when the duct is tilted forwardly.

Figure 6:
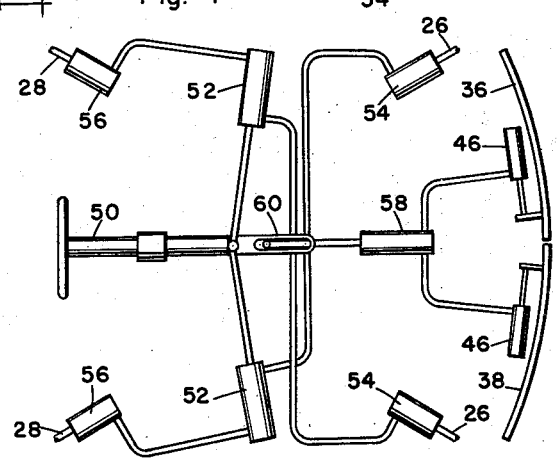
FIGURE 6 is a diagrammatic view of a suitable control system.

One suitable arrangement for this is illustrated in FIGURE 6, which utilizes the basic control system described in the above mentioned copending application. Briefly, this includes a control column 50 slidably mounted for fore and aft motion and connected to a pair of double acting hydraulic cylinders 52. The inner ends of cylinders 52 are connected to actuating cylinders 54 which move the forward control rods 26, while the outer ends of cylinders 52 are coupled to further actuating cylinders 56 which move the rear control rods 28. Thus movement of the control column 50 produces tilting of the duct and corresponding directional reaction. The shutter actuating jacks 46 are illustrated as connected to a common hydraulic cylinder 58 which is coupled to the control column 50 by a slotted bar 60. The slotted coupling allows for free rearward motion of the control column, but forward motion thereof operates the cylinder 58 and opens the shutters 36 and 38, simultaneously with the forward tilting of the duct.

It will be obvious that the controllable slot arrangement can be duplicated in varying proportions in other parts of the duct, to provide added thrust in other directions.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawing are to be considered as merely illustrative rather than limiting.

I claim:

1. The combination of a generally circular duct;
a driven rotor mounted in said duct to provide a flow of air therethrough;
a circumferentially extending air inlet slot in a portion of said duct;
a plurality of spaced support vanes in said slot;
shutter means movably mounted in said inlet slot;
said shutter means having openings spaced to correspond with the spaces between said vanes in one position; and
means to move said shutter means to another position with said openings disposed behind said vanes, whereby the shutter means closes said inlet slot.

2. The combination of a generally circular duct;
an upper rotor and a counter-rotating lower rotor operatively mounted in said duct to provide a flow of air therethrough;
a circumferentially extending air inlet slot inclined downwardly and inwardly in a portion of said duct, the inner end of said slot being disposed below said upper rotor; and
shutter means movably mounted in said inlet slot to control the opening thereof.

3. The combination of an aircraft having a sustaining rotor operatively mounted thereon;
a circular duct surrounding said rotor and enclosing the airflow through the rotor;
a circumferentially extending air inlet slot in the forward portion of said duct; said slot extending downwardly and inwardly and opening into said duct within the axial confines of the swept volume of said rotor; and
shutter means operatively mounted in said inlet slot to control the opening thereof.

4. The combination of an aircraft having a sustaining rotor operatively mounted thereon;
a circular duct surrounding said rotor and enclosing the airflow through the rotor;
a circumferentially extending air inlet slot in the forward portion of said duct;
shutter means operatively mounted in said inlet slot to control the opening thereof;
control means connected to said duct for tilting the duct in selected directions;
said shutter means being interconnected with said control means to open said inlet slot when said duct is tilted forwardly.

References Cited in the file of this patent
UNITED STATES PATENTS
2,568,812     Lee _____ Sept. 25, 1951
FOREIGN PATENTS
1,240,234     France _____ July 25, 1960